United States Patent [19]

Färnström et al.

[11] 4,351,616

[45] Sep. 28, 1982

[54] THERMOMETER GUARD

[75] Inventors: Sven E. Färnström, Trangsviken; Hans Andersson, Nälden, both of Sweden

[73] Assignee: Minitube NYA AB, Trangsviken, Sweden

[21] Appl. No.: 156,341

[22] Filed: Jun. 4, 1980

[30] Foreign Application Priority Data

Jul. 2, 1979 [SE] Sweden ............................. 7905777

[51] Int. Cl.³ .............................................. G01K 1/08
[52] U.S. Cl. .................................... 374/209; 128/736; 374/158
[58] Field of Search ................... 73/362 AR; 128/736; 206/306

[56] References Cited

U.S. PATENT DOCUMENTS

| | | | |
|---|---|---|---|
| 2,969,141 | 1/1961 | Katzin | 206/306 |
| 3,190,436 | 6/1965 | Diamant | 206/306 |
| 3,221,871 | 12/1965 | Hidding | 206/306 |
| 3,500,280 | 3/1970 | Ensign | 73/362 AR X |
| 4,061,226 | 12/1977 | Essen | 206/306 |

FOREIGN PATENT DOCUMENTS 366114  4/1974  Sweden .

*Primary Examiner*—Daniel M. Yasich
*Attorney, Agent, or Firm*—Kurt Kelman

[57] ABSTRACT

An antiseptic guard for a clinical thermometer is formed by a sheath constituted by two synthetic resin films welded together along two lateral edges and a top edge connecting the lateral edges. A welded joint is formed at an end of the sheath spaced from the top edge to hold the tip of the thermometer in position while a bendable flap is formed between the joint and the top edge. When the sheathed thermometer is inserted in the anus, the flap is folded back and exposes smooth surfaces of the films, avoiding direct contact with weld edges and thus preventing formation of sores.

2 Claims, 6 Drawing Figures

THERMOMETER GUARD

The present invention refers to a guard device for a clinical thermometer having a tip.

Nowadays it is usual to provide a thermometer with a thin synthetic resin film sheath as an antiseptic guard when taking the temperature of a patient. Such a thermometer guard consists of two thin plastic films placed one on top of the other and welded together along three edge portions. The sheath is open at one end and an end portion of one film forms a loose flap lying above the other film. A thermometer is inserted in the sheath through the open end. The thermometer has a sharply rounded or pointed tip and is so inserted that the tip presses against the welded top edge and extends the sheath around the pointed tip. In practice it has been found, especially when using thermometers with a pointed tip, that the welded joint running round the top edge can cause the formation of sores when introduced into the anus and other bodily openings of a patient. To avoid this, it has been suggested to turn the protective sheath inside-out, for example. However, since these guards must be mass-produced at a very low price, turning them inside-out during production greatly increases costs. The manufacture of such thermometer guards takes place at great speed with edge welding and removal of excess material in one and the same process. The film material itself, from which the sheath is manufactured, is very soft and the weld edges which arise are also relatively soft. However, in spite of this, there can be difficulties, as mentioned, in conjunction with taking temperature and especially in conjunction with using thermometers with a pointed tip. Thermometers with a ball-shaped end give better results, even though sore formation has occurred in certain cases when taking temperatures with such thermometers, too.

The present invention provides a simple method of solving the problem in question. The invention is substantially based on providing a preferably arcuate joint spaced from the actual top edge portion of the sheath, this joint uniting the two films. When inserted in the anus, the free flap constituted by the united films between the joint and the top edge will fold over so that only smooth film surfaces will be exposed to the sensitive tissues of the anus.

The above and other objects, advantages and features of the present invention will become more apparent from the following detailed description of a now preferred embodiment thereof, taken in conjunction with the accompanying drawing wherein FIG. 1 is a side elevational view of a conventional thermometer guard.

Figure 1:
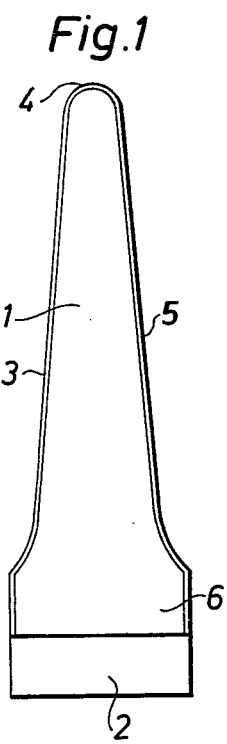
Figure 2:
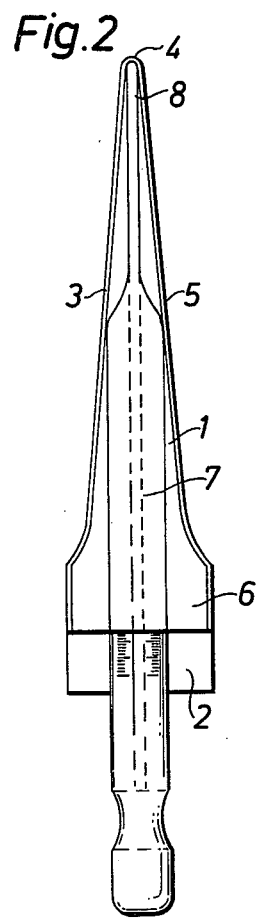
FIG. 2 shows a clinical thermometer inserted into the guard of FIG. 1.
Figure 3:
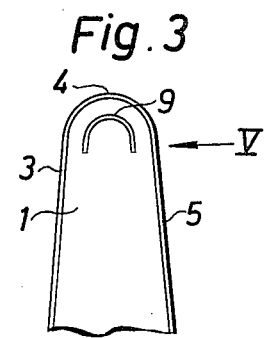
FIG. 3 illustrates a top portion of a guard device in accordance with the invention in side elevation.

Referring now to the prior art guard device for a clinical thermometer shown in FIGS. 1 and 2, it is shown to comprise two like films 1, 2, each film having two lateral edge portions 3, 5 and top edge portion 4 connecting the lateral edge portions. The films are united along the edge portions to form a sheath capable of accommodating clinical thermometer 7 (see FIG. 2) having pointed tip 8. Normally, the films are of flexible synthetic resin and are united by weld seams along the edge portions. Opposite the welded top edge portion 4, the sheath has an open end and end portion 6 of film 1 forms a loose flap lying above the other film 2. When, as shown in FIG. 2, the thermometer is inserted into the sheath through the open end, with its tip leading, the tip will press against, and stretch, the welded end of the sheath so that the sheath is tensioned about the pointed tip of the thermometer.

In FIGS. 3-6, the parts corresponding to those in FIGS. 1 and 2 have the same reference numerals as in the latter Figures. It will be seen from FIG. 3 that the conventional guard device of FIG. 1 is modified according to the invention by further uniting the films forming the sheath by arcuate weld joint 9 welding together films 1 and 2 at an end of the sheath spaced from top edge portion 4. This weld joint prevents the thermometer tip from reaching top edge portion 4 and constitutes a stop for tip 8.

Figure 4:
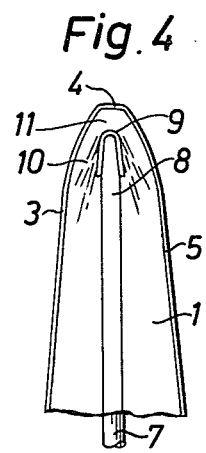
FIG. 4 illustrates the same device but with a clinical thermometer inserted.
Figure 5:
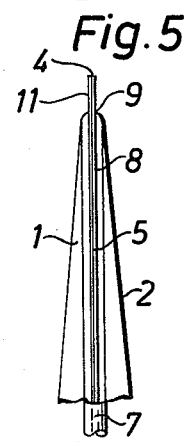
FIG. 5 illustrates the device of FIG. 4 in an end view.

As is apparent from FIG. 4, the arcuate weld joint 9, on the insertion of thermometer tip 8, will receive the pointed thermometer tip and be somewhat deformed by it during unavoidable fold formation 10, which does not have any derogatory effect on the use. As will be seen, a flat bendable flap 11 is formed by the films beyond joint 9. It is clearly seen in FIG. 5 how flap 11 projects above the top end of the thermometer and how joint 9 limits the further movement of the thermometer tip 8.

Figure 6:
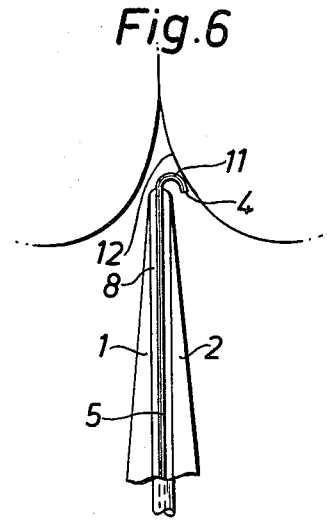
FIG. 6 shows the thermometer and guard device of FIGS. 4 and 5 during the process of being inserted in an anus.

A portion of the anus opening is schematically shown in FIG. 6, and it is here clearly apparent how, during the insertion of the thermometer guarded by the sheath, flap 11 will fold to one side to leave a soft top portion closing round the outer end of the thermometer tip 8. There is thus no weld edge at all at that outer end. It should be emphasized, although it is not entirely apparent from FIG. 6, that the edge portions around the weld 9 of the sheath will also turn to one side and lie along the thermometer tip 8 as soft folds. A double-folding of the side portions starting from the flap into soft fold formation around the thermometer tip also takes place. Thus, only soft and smooth film surfaces will surround the thermometer tip and the insertion will then not be more difficult than inserting a bare thermometer of the kind in question. A thermometer having a ball-shaped tip can also be used with a sheath made in this manner, and in conjunction herewith no discomfort or sore formation will occur at all.

As will be seen, a sheath has been provided in a simple way in accordance with the invention, which is just as simple to manufacture as the sheath already known, since weld 9 can very easily be made in the same high frequency welding operation as welding edges 3, 4 and 5. In practice, it is suitable for weld 9 to be given the form shown in FIG. 3, i.e. between edges 3, 4 and 5 and weld 9 there is free communication between films 1 and 2 so that no bubble formations occur in the tip portion, which could easily occur if weld 9 were taken right out to lateral edges 3 and 5. An embodiment can, however, be conceived where the whole top portion 4 is welded together with a wide weld so that a completely flat welded top portion 11 is formed. This could be used in such cases where material having great flexibility, even after welding, is used.

It should be pointed out that the guard device herein described and illustrated constitutes in practice an inner sheath to a further outer surrounding sheath, the inner sheath being provided with some suitable ointment for use in conjunction with taking temperature. This is clearly apparent from the U.S. Pat. No. 3,215,265, for example.

What is claimed is:

1. A guard device for a clinical thermometer having a tip, which comprises two like films, each film having two lateral edge portions, the films being united along the edge portions to form a sheath having a top edge and being capable of accommodating the thermometer and the films being further united by a joint at an end of the sheath spaced from the top edge, the joint having an arcuate shape conforming to the shape of the tip of the thermometer and the joint constituting a stop spaced from the top edge for the tip of the thermometer accommodated in the sheath, the united films constituting a bendable flap between the joint and the top edge, and the arcuate joint being shaped to permit communication between the interior of the sheath and of the flap, the flap exposing only smooth film surfaces to a body opening of a patient when the flap is bent upon movement of the thermometer accommodated in the sheath into the body opening.

2. The guide device of claim 1, wherein the films are of flexible synthetic resin, and the joint is a weld between the synthetic resin films.

* * * * *